United States Patent
Kumar

(10) Patent No.: US 9,731,387 B2
(45) Date of Patent: Aug. 15, 2017

(54) FURNACE VENT TERMINATION

(75) Inventor: Lalit Kumar, Plano, TX (US)

(73) Assignee: Lennox Industries Inc., Richardson, TX (US)

( * ) Notice: Subject to any disclaimer, the term of this patent is extended or adjusted under 35 U.S.C. 154(b) by 1088 days.

(21) Appl. No.: 12/834,101

(22) Filed: Jul. 12, 2010

(65) Prior Publication Data
US 2011/0174890 A1 Jul. 21, 2011

Related U.S. Application Data

(60) Provisional application No. 61/295,501, filed on Jan. 15, 2010.

(51) Int. Cl.
| | |
|---|---|
| F24F 7/00 | (2006.01) |
| B23P 15/00 | (2006.01) |
| F23D 14/58 | (2006.01) |
| F23D 14/34 | (2006.01) |
| F24H 3/08 | (2006.01) |
| F24H 8/00 | (2006.01) |
| B29C 45/18 | (2006.01) |
| F25D 21/14 | (2006.01) |
| F24H 9/20 | (2006.01) |
| B29L 31/18 | (2006.01) |

(52) U.S. Cl.
CPC .............. *B23P 15/00* (2013.01); *B29C 45/18* (2013.01); *F23D 14/34* (2013.01); *F23D 14/58* (2013.01); *F24H 3/087* (2013.01); *F24H 8/006* (2013.01); *F24H 9/2035* (2013.01); *F25D 21/14* (2013.01); *B29L 2031/18* (2013.01); *F23D 2900/14481* (2013.01); *Y02B 30/106* (2013.01); *Y10T 29/49* (2015.01); *Y10T 29/4935* (2015.01); *Y10T 29/49348* (2015.01); *Y10T 29/49389* (2015.01); *Y10T 29/49826* (2015.01); *Y10T 137/4463* (2015.04)

(58) Field of Classification Search
CPC ........... F24H 3/087; F24H 8/006; F23L 17/04
USPC ......... 126/114, 119, 110 R; 454/8, 319, 330, 454/335, 339–368, 245–248, 309
See application file for complete search history.

(56) References Cited

U.S. PATENT DOCUMENTS

| | | | |
|---|---|---|---|
| 274,567 A * | 3/1883 | Cummings | 126/312 |
| 5,062,354 A | 11/1991 | Goins et al. | |
| 6,647,977 B2 * | 11/2003 | Lesage | F23J 11/06 126/307 A |
| 2004/0250810 A1* | 12/2004 | Schultz et al. | 126/110 R |

(Continued)

FOREIGN PATENT DOCUMENTS

WO    WO 2009154470 A1 * 12/2009 ............... F24F 9/00

*Primary Examiner* — Steven B McAllister
*Assistant Examiner* — Ko-Wei Lin
(74) *Attorney, Agent, or Firm* — Frost Brown Todd LLC

(57) ABSTRACT

One aspect of the disclosure provides a termination for use with a furnace. The termination, in one embodiment, includes a face plate including an exhaust region and an air supply region, the face plate having a front surface and an opposing back surface. The termination, in this embodiment, further includes an exhaust termination portion extending from the back surface in the exhaust region, the exhaust termination portion capable of engaging a terminal end of a variety of different size exhaust conduits associated with a furnace. The termination, in this embodiment, further includes an opening extending through the face plate in the exhaust region, the opening aligned with the exhaust termination portion.

11 Claims, 6 Drawing Sheets

(56) References Cited

U.S. PATENT DOCUMENTS

2008/0129045 A1\* 6/2008 Shimizu ................... 285/258
2010/0089382 A1\* 4/2010 Brown et al. ............ 126/307 A \* cited by examiner

FURNACE VENT TERMINATION

CROSS-REFERENCE TO RELATED APPLICATION

This application claims the benefit of U.S. Provisional Application Ser. No. 61/295,501, filed by Shailesh S. Manohar, et al., on Jan. 15, 2010, entitled "An Improved Heating Furnace for a HVAC System", and incorporated herein by reference in its entirety.

TECHNICAL FIELD

This application is directed, in general, to accessories for furnaces, and, more specifically, to a termination for terminating exhaust and air supply conduits employed by a furnace.

BACKGROUND

A typical furnace (e.g., a high-efficiency HVAC furnace) often employs an exhaust conduit for venting flue gases it generates away from the structure housing it. In many applications, these flue gases exhaust through the roof of the structure. Nevertheless, in certain other applications, the flue gases exhaust through a chimney or through a sidewall of the structure.

When venting the flue gases through a sidewall of a structure, it is also common practice for an air supply conduit to be provided in order to furnish outside air to the furnace for the combustion process. Typically, furnace installations either use separate exhaust conduit and the air supply conduit terminations, wherein the exhaust conduct and air supply conduit are offset, from one another, or use a combined air intake/exhaust termination, which is often referred to as a concentric vent termination. In each of these scenarios, however, the terminations are bulky, unsightly, and take a significant amount of time to install.

Accordingly, what is needed in the art is a termination unit for terminating side by side exhaust and air supply conduits extending through an exterior wall of a structure containing a furnace, which does not experience the problems of prior art designs.

SUMMARY

One aspect provides a termination for use with a furnace. The termination, in one embodiment, includes a face plate including an exhaust region and an air supply region, the face plate having a front surface and an opposing back surface. The termination, in this embodiment, further includes an exhaust termination portion extending from the back surface in the exhaust region, the exhaust termination portion capable of engaging a terminal end of a variety of different size exhaust conduits associated with a furnace. The termination, in this embodiment, further includes an opening extending through the face plate in the exhaust region, the opening aligned with the exhaust termination portion.

Another embodiment provides a method of fabricating a termination for use with a furnace. This embodiment comprises providing a face plate including an exhaust region and an air supply region, the face plate having a front surface and an opposing back surface, forming an exhaust termination portion extending from the back surface in the exhaust region, the exhaust termination portion capable of engaging a terminal end of a variety of different size exhaust conduits associated with a furnace, and creating an opening, the opening extending through the face plate in the exhaust region and aligned with the exhaust termination portion.

In another embodiment, a heating system is provided. In one embodiment, the heating system comprises a furnace, the furnace including a cabinet, a blower located within the cabinet and positioned to force or draw air through the cabinet, a gas control valve located proximate the cabinet, burners located within the cabinet and coupled to the gas control valve, and a heat exchanger positioned within the cabinet to receive a gas flame from the burners. The heating system, in accordance with the disclosure, further includes a termination configured to couple to the furnace via a variety of different size exhaust conduits. The termination, in this embodiment, includes: 1) a face plate including an exhaust region and an air supply region, the face plate having a front surface and an opposing back surface, 2) an exhaust termination portion extending from the back surface in the exhaust region, the exhaust termination portion capable of engaging a terminal end of the variety of different size exhaust conduits, and 3) an opening extending through the face plate in the exhaust region, the opening aligned with the exhaust termination portion.

BRIEF DESCRIPTION OF DRAWINGS

Reference is now made to the following descriptions taken in conjunction with the accompanying drawings, in which.

DETAILED DESCRIPTION

Figure 1A:
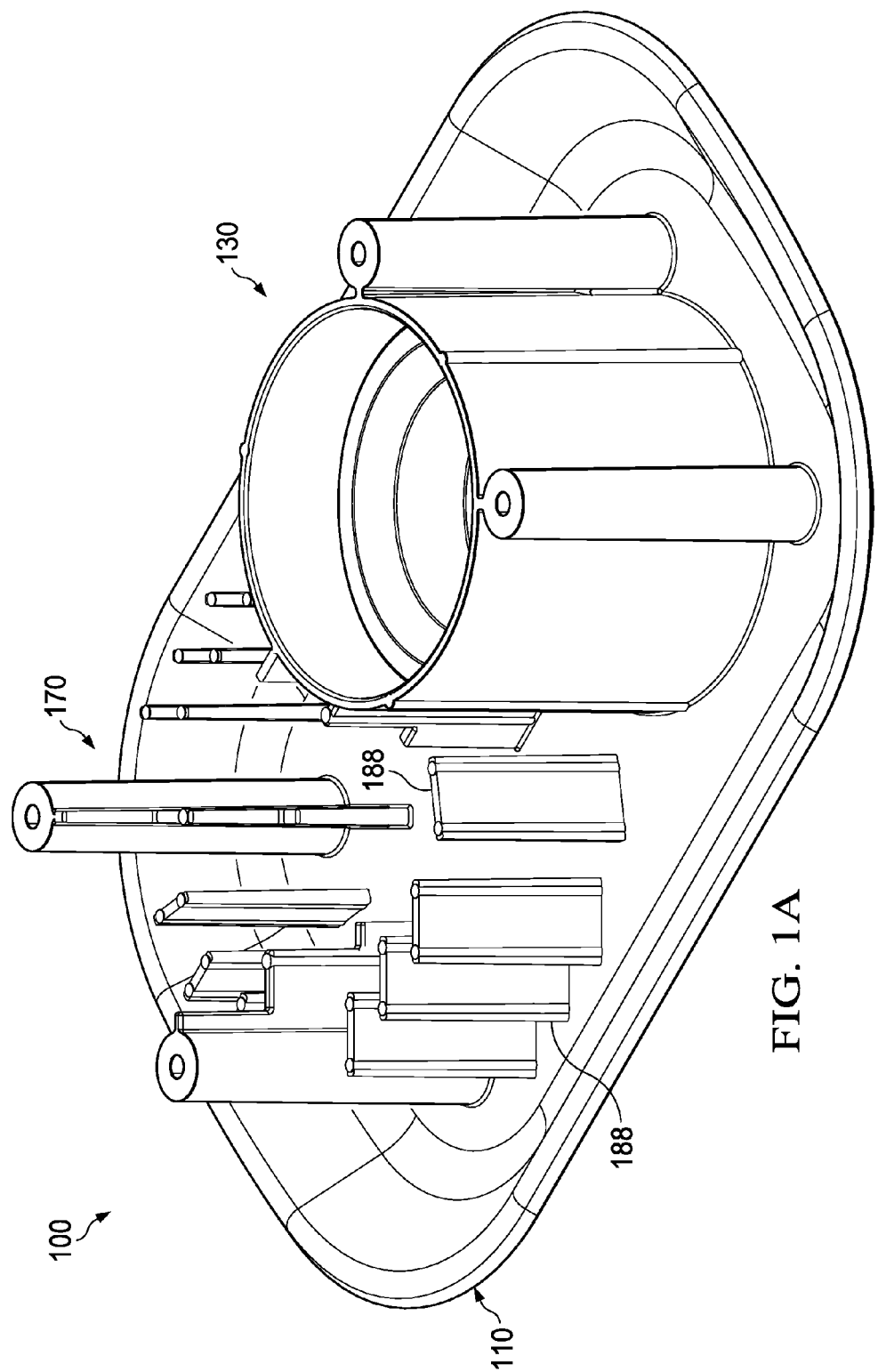
FIGS. 1A thru 1E illustrate various different views of a termination in accordance with the disclosure.
Figure 1B:
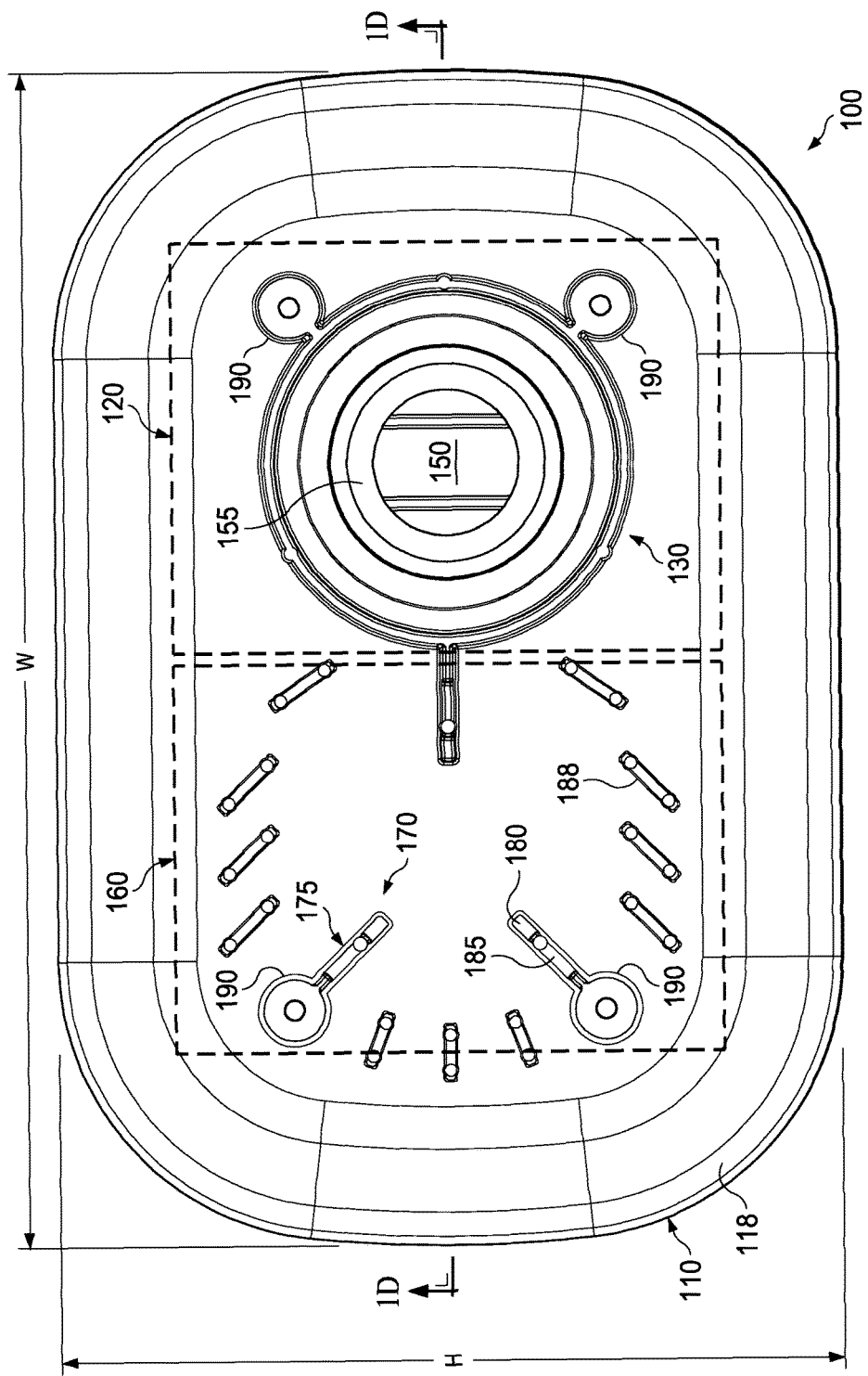
Figure 1C:
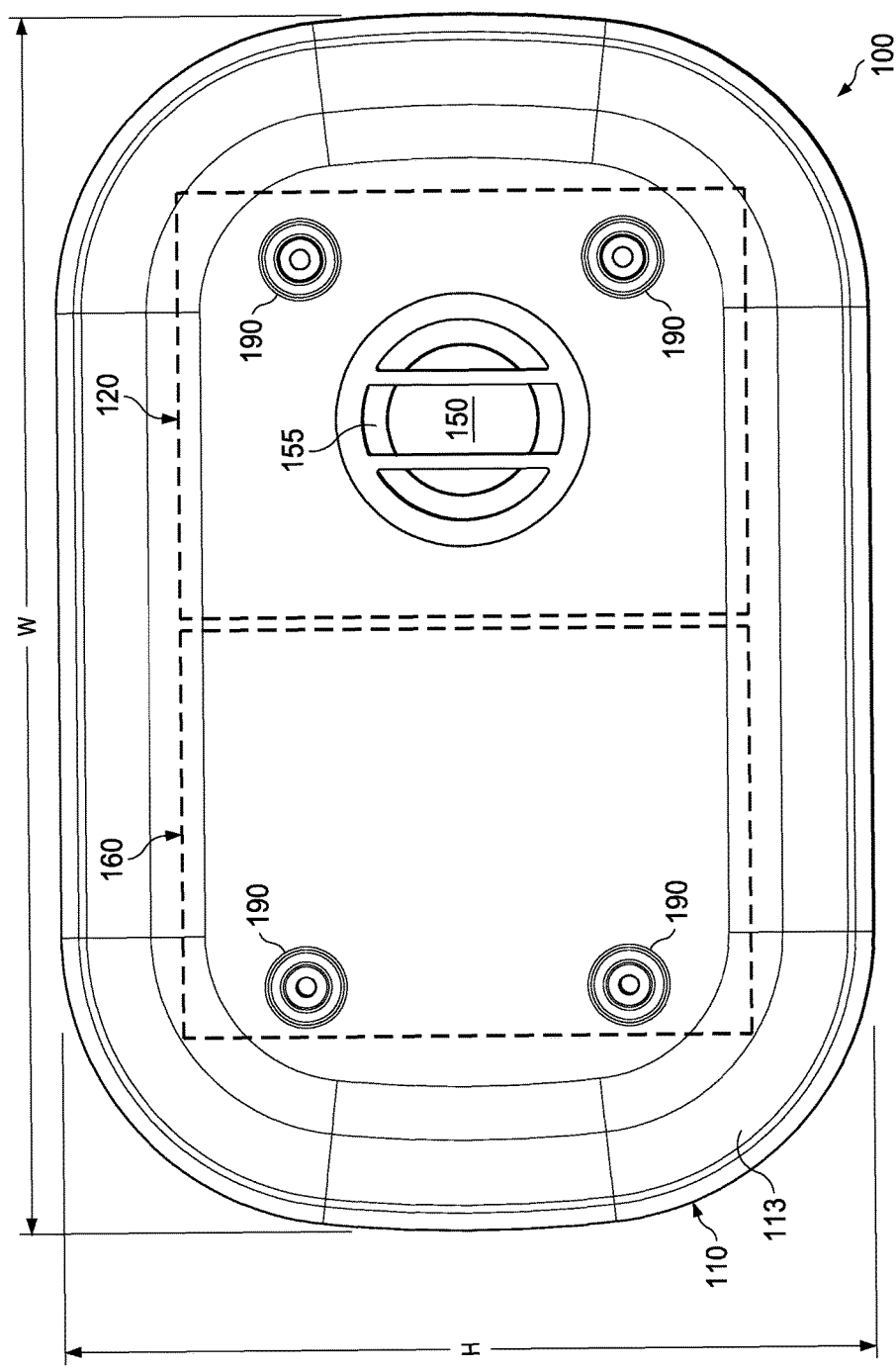
Figure 1D:
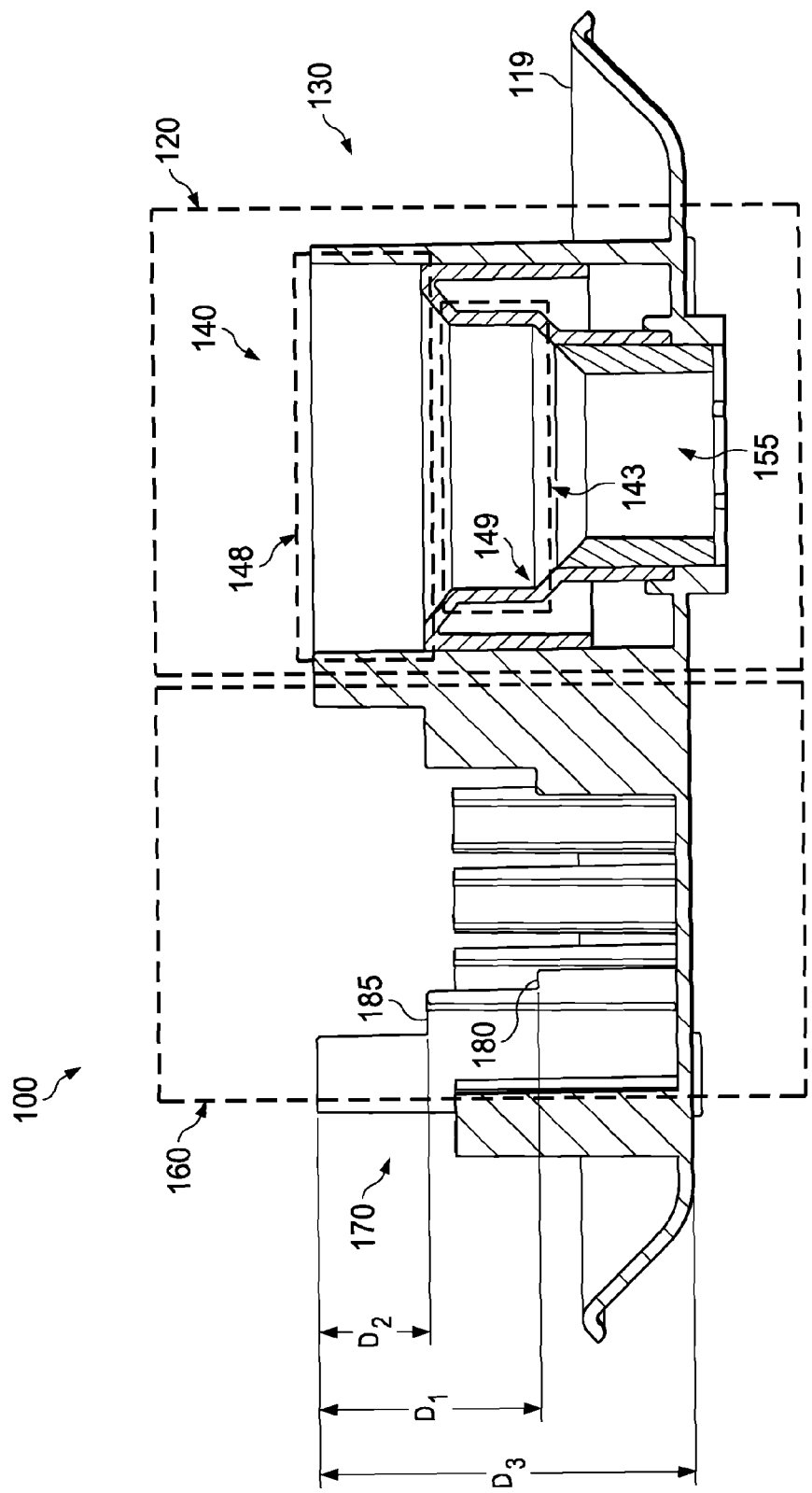

Referring initially to FIGS. 1A thru 1D, illustrated are various different views of an embodiment of a termination 100 provided in accordance with this disclosure. Specifically, FIG. 1A illustrates a perspective view of the termination 100, whereas FIGS. 1B and 1C illustrate a back surface view and front surface view of the termination 100, respectively, and FIG. 1D illustrates a cross-sectional view of the termination taken through the line D-D in FIG. 1B.

A termination in accordance with this disclosure, such as the termination 100 of FIGS. 1A thru 1D, is typically configured to be used with a furnace, conventional or otherwise. Notwithstanding, such a termination is not limited to any particular type of furnace it is to be used with. For example, in one embodiment the termination 100 may be configured to be used with a high-efficiency residential HVAC furnace. In another embodiment, the termination 100 may be configured to be used with a commercial HVAC furnace. In yet another embodiment, the termination 100 may be used with a water heating furnace, among others.

The termination 100 of FIGS. 1A thru 1D initially includes a face plate 110. The face plate 110, in this embodiment, includes a front surface 113 and an opposing back surface 118. The face plate 110 further includes an exhaust region 120 and an air supply region 160. As those skilled in the art appreciate, the exhaust region 120 is configured to dissipate flue gasses (e.g., exhaust gasses) received from an associated furnace, whereas the air supply region 160 is configured to provide fresh combustion air to the associated furnace.

The face plate 110, in the embodiment shown, includes a width (w) and a height (h). The width (w) and height (h) of the face plate 110 may vary greatly and remain within the purview of the disclosure. In one embodiment, however, the width (w) ranges from about 8 inches to about 16 inches, and the height (h) ranges from about 6 inches to about 10 inches. In yet another embodiment, the width (w) ranges from about 11 inches to about 13 inches, and the height (h) ranges from about inches to about 9 inches. The face plate 110 may further include a lip 119 extending inwardly there from.

The termination 100 of FIGS. 1A thru 1D includes an exhaust termination portion 130 that extends from the back surface 118 of the face plate 110 in the exhaust region 120. The exhaust termination portion 130, in accordance with the disclosure, is configured to engage a terminal end of a variety of different size exhaust conduits associated with the furnace. For example, the exhaust termination portion 130 is configured to engage a terminal end of a first exhaust conduit having a first size, or a terminal end of a second exhaust conduit having a second different size, without any modification thereto. Accordingly, a single termination 100 may be sold for, and used with, different chosen conduit configurations. While the embodiment of FIGS. 1A thru 1D illustrates that the termination 100 can handle only two different size exhaust conduits, those skilled in the art understand that the present disclosure is not limited to only two, and that other embodiments exist wherein the termination 100 can handle three or more different size exhaust conduits.

In the embodiment of FIGS. 1A thru 1D, the exhaust termination portion 130 comprises a sleeve 140 capable of accepting the terminal end of the variety of different size exhaust conduits. For example, in the embodiment shown, the sleeve 140 is circular in nature, and thus would be configured to accept the terminal end of a variety of different diameter exhaust conduits, whether those exhaust conduits comprise metal, plastic (e.g., PVC), or another suitable material.

To accept these different diameter exhaust conduits, the sleeve 140 might have a first portion 143 capable of accepting a smaller diameter exhaust conduit, and a second portion 148 capable of accepting a larger diameter exhaust conduit. In the embodiment of FIGS. 1A thru 1D, the first portion 143 is located more near the face place 110 than the second portion 148. Likewise, to facilitate the placement of the smaller diameter exhaust conduit within the exhaust termination portion 130, the sleeve 140 may include a smooth transition 149 (e.g., a slanted sidewall in one embodiment) coupling the first and second portions 143, 148.

Figure 1E:
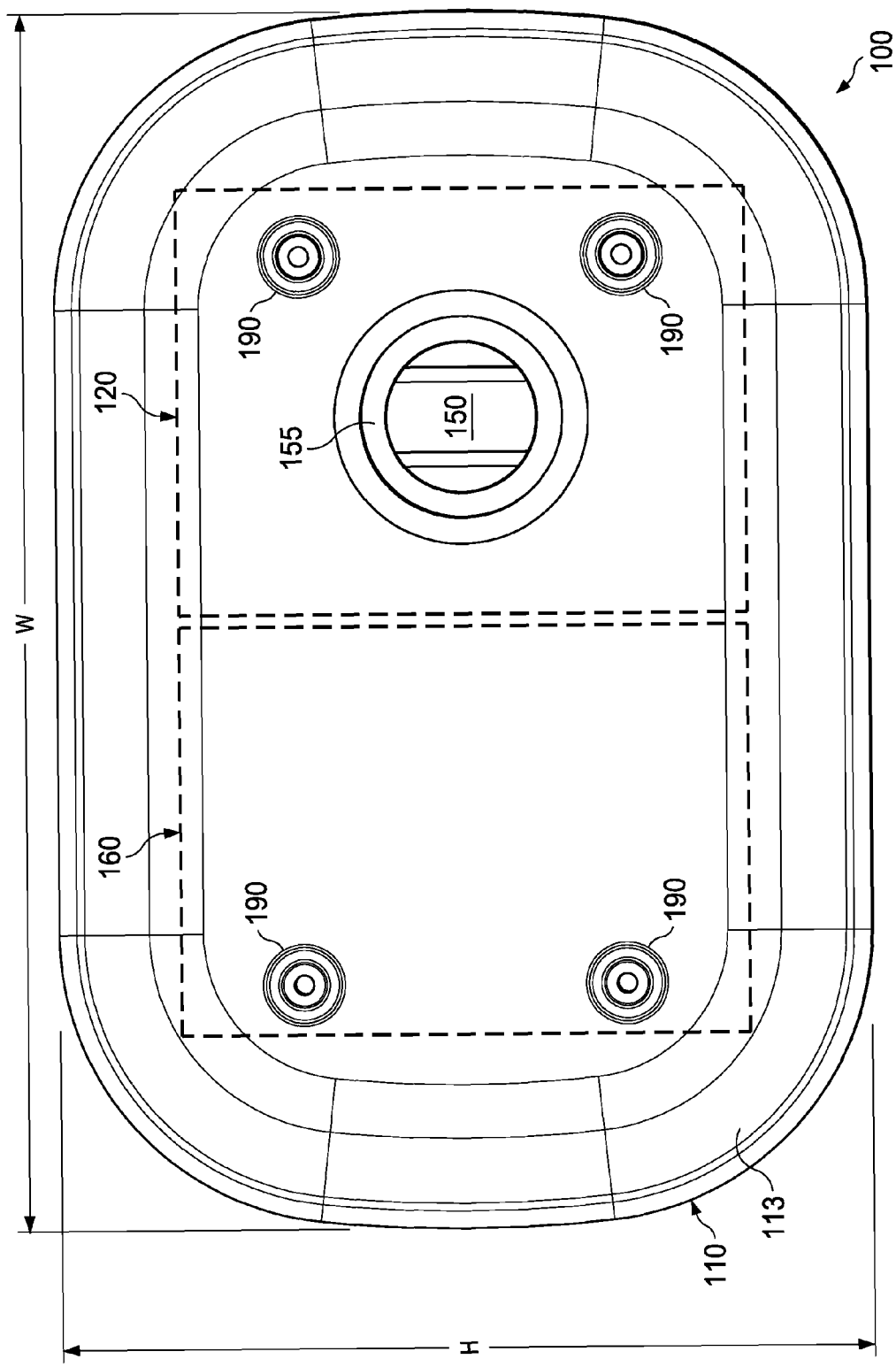

The termination 100 of FIGS. 1A thru 1D further includes an opening 150 extending through the face plate 110. The opening 150, in this embodiment, is aligned with the exhaust termination portion 130, and thereby causes any flue gasses received from the furnace to exit the termination 100 from the front surface 113 of the face plate 110. Positionable within the opening 150, in the embodiment shown, is a reducing element 155. The reducing element 155, if used, may be configured to accelerate a flow of flue gasses away from the face plate 110. Accordingly, the flue gasses are less likely to mix with fresh combustion air, as the flue gasses are leaving the termination with greater velocity. As those skilled in the art appreciate, the reducing element 155 may be removably positioned within the opening 150 from the back surface 118 of the face plate 110. As shown in FIG. 1E, the reducing element may also be positioned within the opening 150 from the front surface 113 of the face plate 110.

The termination 100 of FIGS. 1A thru 1D may further include an air supply termination portion 170 that extends from the back surface 118 of the face plate 110 in the air supply region 160. The air supply termination portion 170, in accordance with one embodiment of the disclosure, is configured to engage a terminal end of a variety of different size air supply conduits. Thus, much like the exhaust termination portion 130, the air supply termination portion 170 is configured to engage a terminal end of a first air supply conduit having a first size, or a terminal end of a second air supply conduit having a second different size, without any modification thereto. While the embodiment of FIGS. 1A thru 1D illustrates that the termination can handle only two different size air supply conduits, those skilled in the art understand that the present disclosure is not limited to only two, and that other embodiments exist wherein the termination can handle three or more different size air supply conduits.

The air supply termination portion 170 illustrated in FIGS. 1A thru 1D comprises a plurality of stop elements 175 configured to engage the plurality of different size air supply conduits. In this embodiment, the plurality of stop elements 175 are configured to position the terminal end of the chosen air supply conduit away from the back surface 118 of the face plate 110, and are further arranged to lie on a circle having substantially the same diameter as the plurality of different size air supply conduits. In accordance with one embodiment, the plurality of stop elements 175 might each include two or more steps to engage different diameters of air supply conduits. For example, the plurality of stop elements 175 might have a first step portion 180 capable of accepting a smaller diameter air supply conduit, and a second step portion 185 capable of accepting a larger diameter air supply conduit. In the embodiment of FIGS. 1A thru 1D, the first step portion 180 is located more near the face place 110 than the second step portion 185. In the embodiment of FIGS. 1A thru 1D, a plurality of fins 188 at least partially surround the air supply termination portion 170, and not the entire back surface of the termination 100. Other embodiments exist wherein the plurality of fins 188 surround the entire back surface of the termination 100, among many different possible configurations. As those skilled in the art appreciate, the plurality of fins 188 are configured to reduce the amount of debris that may enter the air supply termination portion 170.

In an exemplary embodiment, the position of the first step portion 180 of the stop elements 175 would substantially coincide with a position of the first portion 143 of the sleeve 140, and the position of the second step portion 185 of the stop elements 175 would substantially coincide with a position of the second portion 148 of the sleeve 140. For example, the distance ($D_1$) of the first step portion 180 and the first portion 143 from a back most location of the termination 100 might range from about 1.5 inches to about 2.5 inches (e.g., about 2 inches) in one embodiment. Likewise, the distance ($D_2$) of the second step portion 185 and the second portion 148 from a back most location of the termination 100 might range from about 0.5 inches to about 1.5 inches (e.g., about 1 inch) in this embodiment.

The termination 100 may further include mounting features 190 for mounting the termination 100 to an exterior surface. In the embodiment shown, the mounting features 190 are mounting posts, integrated with the exhaust termination portion 130 and air supply termination portion 170. Nevertheless, other features other than the mounting posts shown may be used. As those skilled in the art appreciate, the mounting features 190 not only help mount the termination 100 to an exterior surface of a structure, but they additionally position the face plate 110 a desired distance from the exterior surface of the structure. For example, in one embodiment the mounting features 190 are of a length sufficient to cause the face plate 110 to be separated from the exterior surface of the structure by a distance ($D_3$) ranging form about 2 inches to about 5 inches, and in another embodiment ranging from about 2.5 inches to about 4 inches.

A termination, such as the termination 100 of FIGS. 1A thru 1D, may be installed using a number of different processes. For example, in one embodiment the termination would be installed by first ascertaining the size (e.g., diameter) of the exhaust conduit and air supply conduit exiting the structure. Knowing the size of the exhaust conduit and air supply conduit, the exhaust conduit and air supply conduit may be cut to a predetermined length, for instance a length consistent with the distance (D1) or distance (D2) shown in FIG. 1D. For example, if the exhaust conduit and air supply conduit are of the smaller diameter that the termination is configured to terminate, the cut lengths of the exhaust conduit and air supply conduit will be longer than if the exhaust conduit and air supply conduit are of the larger diameter that the termination is configured to terminate. For example, in the embodiment of FIGS. 1A thru 1D, the smaller diameter exhaust conduit and air supply conduit would be cut to a length around about 2 inches, and the larger diameter exhaust conduit and air supply conduit would be cut to a length around about 1 inches. Obviously, these dimensions may vary based upon the design of the termination, and the actual values of the distance (D1) and distance (D2) shown in FIG. 1D.

After cutting the exhaust conduit and air supply conduit to the appropriate predetermined lengths, epoxy may then be placed on the terminal ends of the exhaust conduit and air supply conduit, on the interior surfaces of the exhaust termination portion and air supply termination portion, or on both. Thereafter, the termination may be slipped onto the exhaust conduit and air supply conduit, the epoxy providing a good seal. Screws may then be placed within the mounting features of the termination, thereby fixing the termination to the structure.

A termination in accordance with this disclosure, such as the termination 100 of FIGS. 1A thru 1D, may be manufactured using a variety of different processes. In one embodiment, the entire termination may be formed using an injection molding process. As such, the termination could comprise a single unit configured to attach (e.g., using screws, bolts, nails, etc.) directly to an exterior surface of a structure (e.g., a sidewall of a home or business). As the termination in this embodiment comprises a single unit, it is easier to install than other configurations. While slight focus has been placed on the fact that the termination may be manufactured using an injection molding process, any other manufacturing process is considered within the scope of the disclosure.

Figure 2:
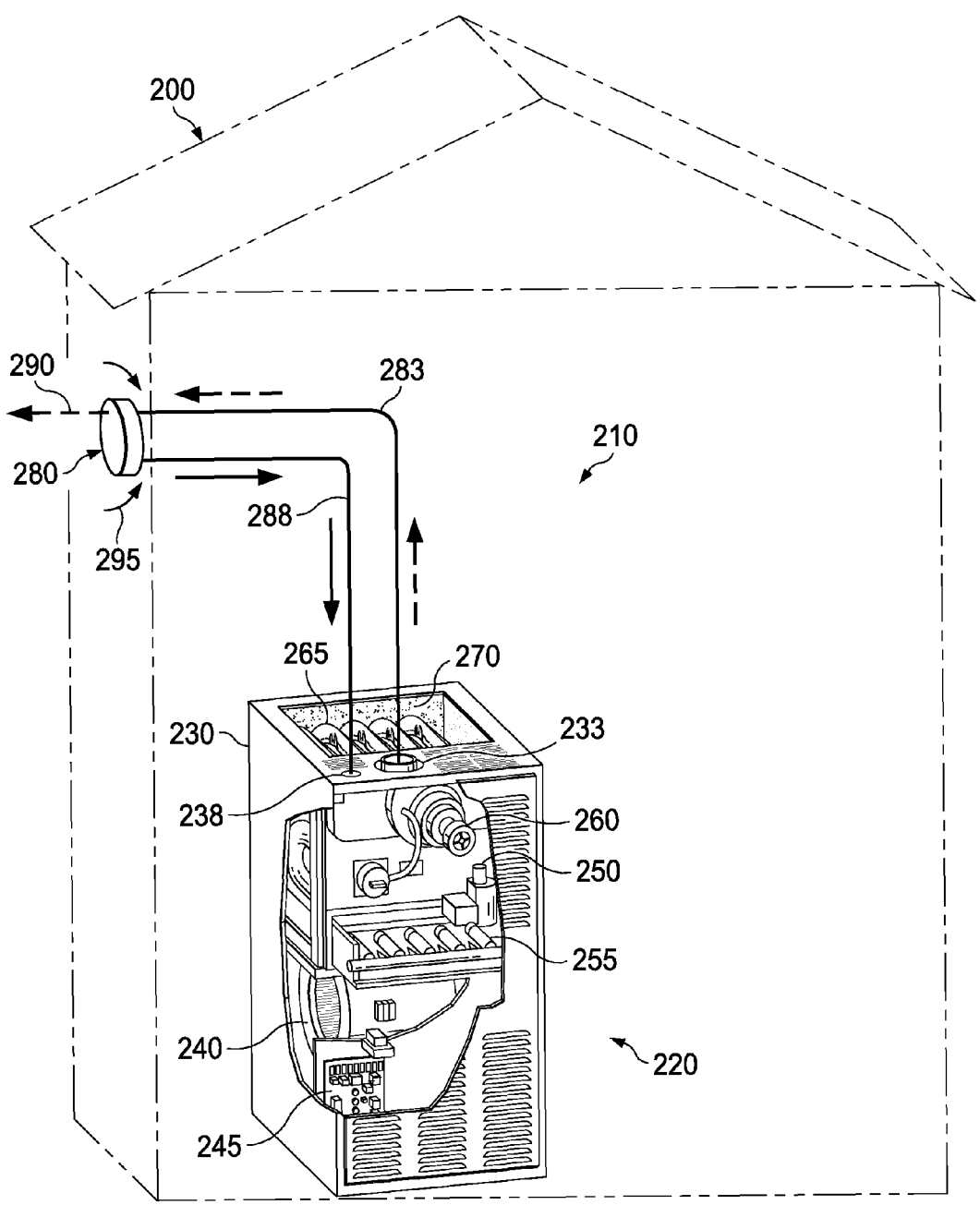
FIG. 2 illustrates a heating system in accordance with the disclosure.

Turning to FIG. 2, illustrated is an enclosure 200, such as a residential or commercial building, employing a heating system 210 in accordance with the disclosure. The heating system 210, in one embodiment, includes a furnace 220 coupled to a termination 280. The furnace 220 is described without limitation in terms of a gas-fired system. Those skilled in the pertinent art will appreciate that the principles disclosed herein may be extended to furnace systems using other fuel types.

The furnace 220 includes various subsystems that may be conventional. In one embodiment, the furnace 220 includes a cabinet 230 having an exhaust outlet 233 and a combustion air inlet 238. The cabinet 230, in this embodiment, encloses a blower 240 configured to force air through said cabinet 230. The cabinet 230, in this embodiment, further includes a controller 245, a gas control valve 250, burners 255, and an exhaust blower 260 coupled to the exhaust outlet 233. A heat exchanger assembly 265 is located within a plenum 270. The controller 245, in this embodiment, controls the burners 255 and the exhaust blower 260 to burn a heating fuel, e.g. natural gas, and move exhaust gases through the heat exchanger assembly 265 to the exhaust outlet 233. The controller 245 may further control the blower 240 to move air over the heat exchanger assembly 265, thereby transferring heat from the exhaust gases to the air stream.

The heating system 210 of FIG. 2 further includes the termination 280 coupled to the furnace 220 via an exhaust conduit 283 attached to the exhaust outlet 233, as well as via an air supply conduit 288 attached to the combustion air inlet 238. The termination 280, in accordance with the disclosure, may include a face plate including an exhaust region and an air supply region, the face plate having a front surface and an opposing back surface. The termination 280, in accordance with the disclosure, may further include an exhaust termination portion extending from the back surface in the exhaust region, the exhaust termination portion capable of engaging a terminal end of a variety of different size exhaust conduits associated with the furnace, the exhaust conduit 283 in this embodiment. The termination, in accordance with the disclosure, may further include an opening extending through the face plate in the exhaust region, the opening aligned with the exhaust termination portion. In one embodiment, the termination 280 is substantially similar to the termination 100 of FIGS. 1A thru 1D. In another embodiment, the termination 280 only includes a portion of the features of the termination 100 of FIGS. 1A thru 1D.

A heating system, such as the heating system 210 of FIG. 2, is configured to force flue gasses 290 from the furnace 220 through the exhaust conduit 283 and out the front surface of the termination 280, while drawing fresh combustion air 295 around the back surface of the termination 280, through the air supply conduit 288 and to the furnace 210 for combustion. In an exemplary embodiment, the termination 280 is configured such that limited, if any, exhaust gasses 290 are drawn back in as fresh combustion air 295.

Those skilled in the art to which this application relates will appreciate that other and further additions, deletions, substitutions and modifications may be made to the described embodiments.

What is claimed is:

1. A termination for use with a furnace, comprising:
   a face plate including an exhaust region and an air supply region, the face plate having a front surface and an opposing back surface;
   an exhaust termination portion extending from the back surface in the exhaust region, the exhaust termination portion comprising a sleeve capable of engaging a terminal end of a variety of different size exhaust conduits associated with a furnace;
   an opening extending through the face plate in the exhaust region, the opening aligned with the exhaust termination portion;
   a reducing element removably positioned within the opening to accelerate a flow of exhaust away from the face plate;
   an air supply termination portion extending from the back surface in the air supply region;
   a plurality of stop elements comprising a plurality of step portions operable to engage a variety of different size air supply conduits, wherein at least one of the stop elements is coupled to the sleeve; and a plurality of freestanding fins at least partially surrounding the air supply termination portion, extending from the back surface toward an air supply conduit associated with the furnace, and perpendicular to the back surface, and operable to reduce the amount of debris able to enter the air supply region.

2. The termination as recited in claim 1 wherein the plurality of freestanding fins are independent of the plurality of stop elements and extend further than a first step portion of the plurality of step portions.

3. The termination as recited in claim 1 further comprising a first plurality of mounting posts coupled to one or more of the plurality of stop elements and a second plurality of mounting posts coupled to the sleeve.

4. The termination as recited in claim 1 wherein at least one of the plurality of freestanding fins is positioned at an angle with respect to a radius from the center of the air supply conduit.

5. The termination as recited in claim 1 wherein the plurality of freestanding fins extend in a direction parallel with airflow in the air supply conduit associated with the furnace.

6. The termination as recited in claim 1, wherein the plurality of freestanding fins partially surround the entire back surface.

7. A heating system, comprising:
a furnace, including:
a cabinet having an exhaust outlet and a combustion air inlet;
a blower located within the cabinet and positioned to force air through the cabinet;
a gas control valve located proximate the cabinet;
burners located within the cabinet and coupled to the gas control valve; and
a heat exchanger positioned within the cabinet to receive a gas flame from the burners; and
a termination configured to couple to the furnace via an exhaust conduit coupled to the exhaust outlet, the termination including:

a face plate including an exhaust region and an air supply region, the face plate having a front surface and an opposing back surface;
an exhaust termination portion extending from the back surface in the exhaust region, the exhaust termination portion comprising a sleeve capable of engaging a terminal end of a variety of different size exhaust conduits;
an opening extending through the face plate in the exhaust region, the opening aligned with the exhaust termination portion;
a reducing element removably positioned within the opening to accelerate a flow of exhaust away from the face plate;
an air supply termination portion extending from the back surface in the air supply region;
a plurality of stop elements comprising a plurality of step portions operable to engage a variety of different size air supply conduits, wherein at least one of the stop elements is coupled to the sleeve; and
a plurality of freestanding fins at least partially surrounding the air supply termination portion, extending from the back surface toward an air supply conduit associated with the furnace, and perpendicular to the back surface, and operable to reduce the amount of debris able to enter the air supply region.

8. The termination as recited in claim 1, wherein the reducing element is positionable within the opening from the front surface of the face plate.

9. The termination as recited in claim 1, wherein the reducing element is positionable within the opening from the back surface of the face plate.

10. The heating system as recited in claim 7, wherein the reducing element is positionable within the opening from the front surface of the face plate.

11. The heating system as recited in claim 7, wherein the reducing element is positionable within the opening from the back surface of the face plate.

* * * * *